United States Patent
Sahasi et al.

(10) Patent No.: US 7,711,722 B1
(45) Date of Patent: May 4, 2010

(54) WEBCAST METADATA EXTRACTION SYSTEM AND METHOD

(75) Inventors: Jayesh Sahasi, Fremont, CA (US); Kamalaksha Ghosh, Sunnyvale, CA (US)

(73) Assignee: ON24, Inc., San Francisco, CA (US)

( * ) Notice: Subject to any disclaimer, the term of this patent is extended or adjusted under 35 U.S.C. 154(b) by 594 days.

(21) Appl. No.: 11/245,914

(22) Filed: Oct. 7, 2005

(51) Int. Cl.
G06F 17/30 (2006.01)
G06F 17/00 (2006.01)

(52) U.S. Cl. .................. 707/705; 709/203; 709/204; 715/730

(58) Field of Classification Search ............... 707/104.1
See application file for complete search history.

(56) References Cited

U.S. PATENT DOCUMENTS

| | | | |
|---|---|---|---|
| 6,008,807 A * | 12/1999 | Bretschneider et al. ..... | 715/732 |
| 6,396,500 B1 * | 5/2002 | Qureshi et al. .............. | 345/473 |
| 6,728,753 B1 * | 4/2004 | Parasnis et al. ............. | 709/203 |
| 7,454,708 B2 * | 11/2008 | O'Neal et al. ............... | 715/730 |
| 2004/0153504 A1 * | 8/2004 | Hutchinson et al. ......... | 709/204 |
| 2004/0167896 A1 * | 8/2004 | Eakin .......................... | 707/10 |
| 2006/0048058 A1 * | 3/2006 | O'Neal et al. ............... | 715/730 |

OTHER PUBLICATIONS

NPL#1, UoW-EauClaire Microsoft PowerPoint 2003, Sep. 2004, http://web.archive.org/web/20040919191008/http://www.uwec.edu/help/ppoint03.htm, archived: Sep. 19, 2004, printed: Jan. 10, 2008.*

NPL#1a, UoW-EauClaire Microsoft PowerPoint 2003, Dec. 2004, http://web.archive.org/web/20041221201404/www.uwec.edu/help/PPoint03/webenvir.htm, archived: Dec. 21, 2004, printed: Jan. 10, 2008.*

NPL#2, Microsoft Corporation, Oct. 2004, COM: Component Object Model Technologies, http://web.archive.org/web/20041023025124/http://www.microsoft.com/com/default.mspx, archived: Oct. 23, 2004, printed: Jan. 10, 2008.*

* cited by examiner

Primary Examiner—Yicun Wu
(74) Attorney, Agent, or Firm—DLA Piper LLP (US)

(57) ABSTRACT

A metadata extraction and display system and method are provided in which the system extracts metadata from a presentation and then, based on a configuration, displays the extracted metadata synchronized with the display elements of the presentation.

19 Claims, 14 Drawing Sheets

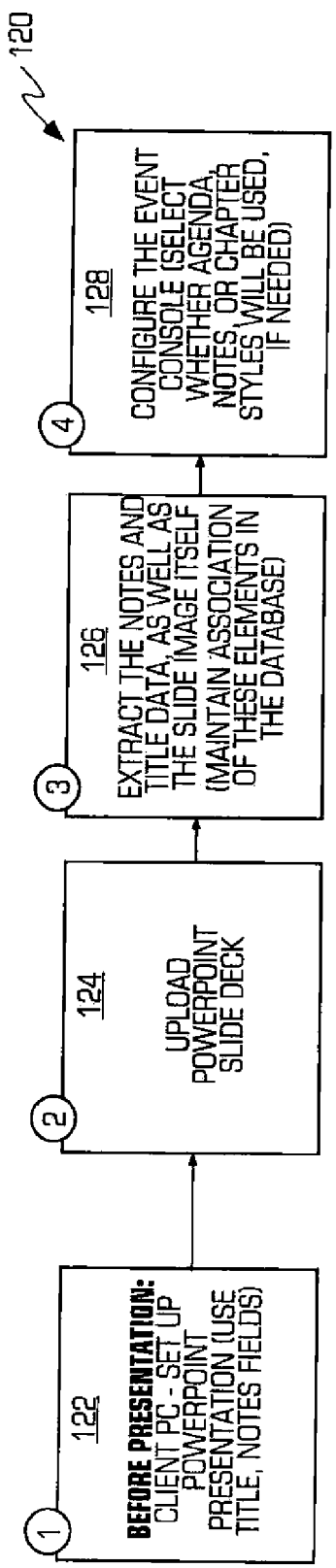
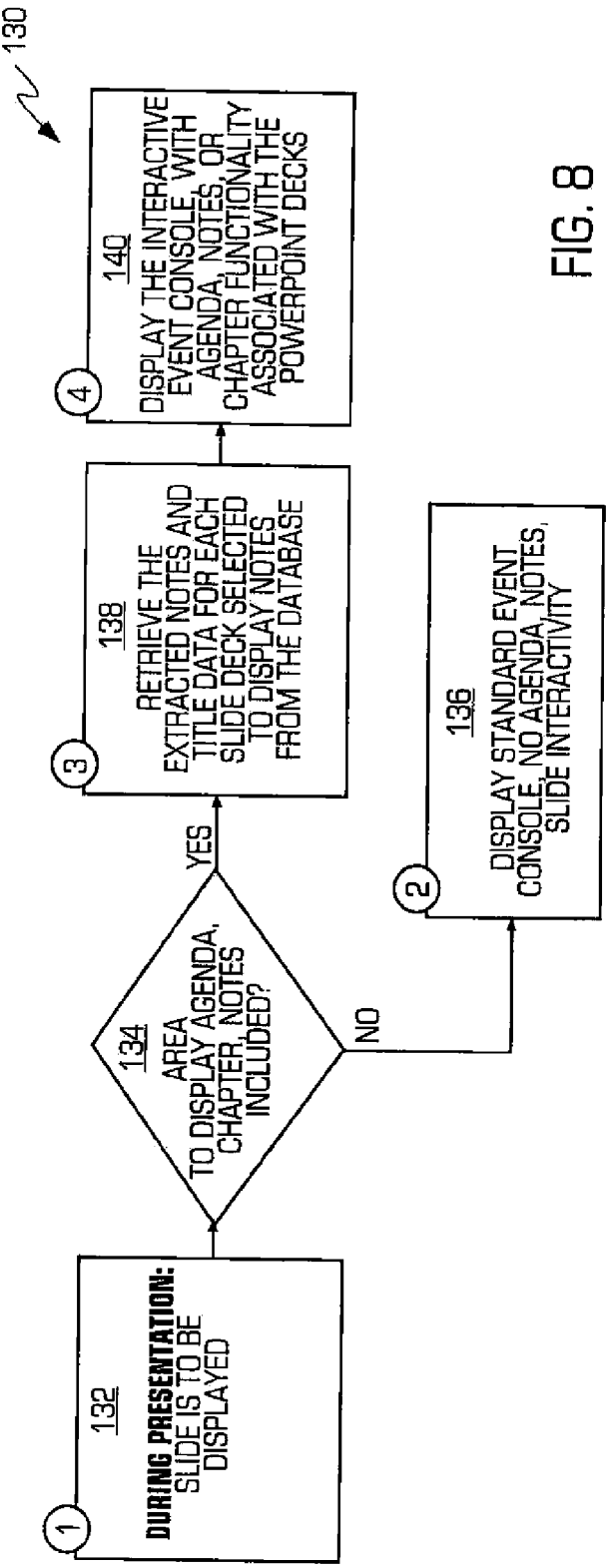
FIG. 7
FIG. 8

WEBCAST METADATA EXTRACTION SYSTEM AND METHOD

FIELD OF THE INVENTION

This invention relates generally to online multimedia communications and in particular to a system for using information stored in a Microsoft PowerPoint file to provide extended functionality within the context of a user interface viewed by audience of a webcast or a web-conference.

BACKGROUND OF THE INVENTION

Various types of online multimedia presentations are known including webcasts and web-conferences. A webcast is an online presentation that includes and audio or video component that is delivered over the internet. A web-conference is an online presentation that may include a telephone-based audio/video component, but also includes a standard internet-based audio or video stream such as delivered by Quicktime, Real, or Windows Media Servers.

One of the primary problems associated with online presentations is the desire to add "metadata" into the online presentation. The addition of the "metadata" makes the experience feature rich and compelling and adds interactivity to what would otherwise be accomplished in a more static manner by just reading a text file or listening to a recording. To be more specific, one of the primary functions of online webcasts and web conferences is the ability to present a sequence of "slides" extracted from a Microsoft PowerPoint document, and to be able to add interactive elements to it. The technique most commonly used to address this problem is to require manual entry of the metadata into a data-repository, typically a database, using client software that may web-based, or may require installing a software package. It is desirable to have a system that automatically extracts the metadata from a file, such as a Microsoft PowerPoint presentation. Thus it is desirable to provide a webcast metadata extraction system and method and it is to this end that the present invention is directed.

SUMMARY OF THE INVENTION

A metadata extraction system and method are provided in which metadata from a presentation is extracted and then displayed (based on configuration settings) with an online presentation wherein the metadata is synchronized with the presentation materials. In one embodiment, the presentation is a Microsoft PowerPoint file although the metadata extraction system may be used with other types of files. When used with a PowerPoint file, since a PowerPoint is the typical medium for generating graphical "slides", the system bypasses the need for additional software or external user accounts for the purpose of adding "agenda", "transcript", and "chapter" type functionality to an webcast or web conference. The system is fully self-contained, and does not require downloads of proprietary software for configuring the functionality under discussion, beyond the ubiquitous MS PowerPoint software originally used to create the slide presentation. The system also does not require data entry in an external software system or database to store meta-data associated with a presentation.

Thus, in accordance with the invention, a metadata extraction and presentation tool for an online presentation is provided. The tool has a database containing a presentation file having one or more display elements and a metadata extraction tool coupled to the database that automatically extracts one or more pieces of metadata from the presentation file contained in the database wherein the one or more pieces of metadata being associated the one or more display elements of the presentation file. The tool also has an event console having a display element portion and a metadata display portion wherein the display element portion displays a particular display element of the presentation and the metadata display portion displays a configurable portion of the extracted metadata associated with the particular display element.

BRIEF DESCRIPTION OF THE DRAWINGS

FIG. 7 illustrates a metadata extraction method;

FIG. 8 illustrates a online presentation method using the extracted metadata;

DETAILED DESCRIPTION OF A PREFERRED EMBODIMENT

Figure 1:
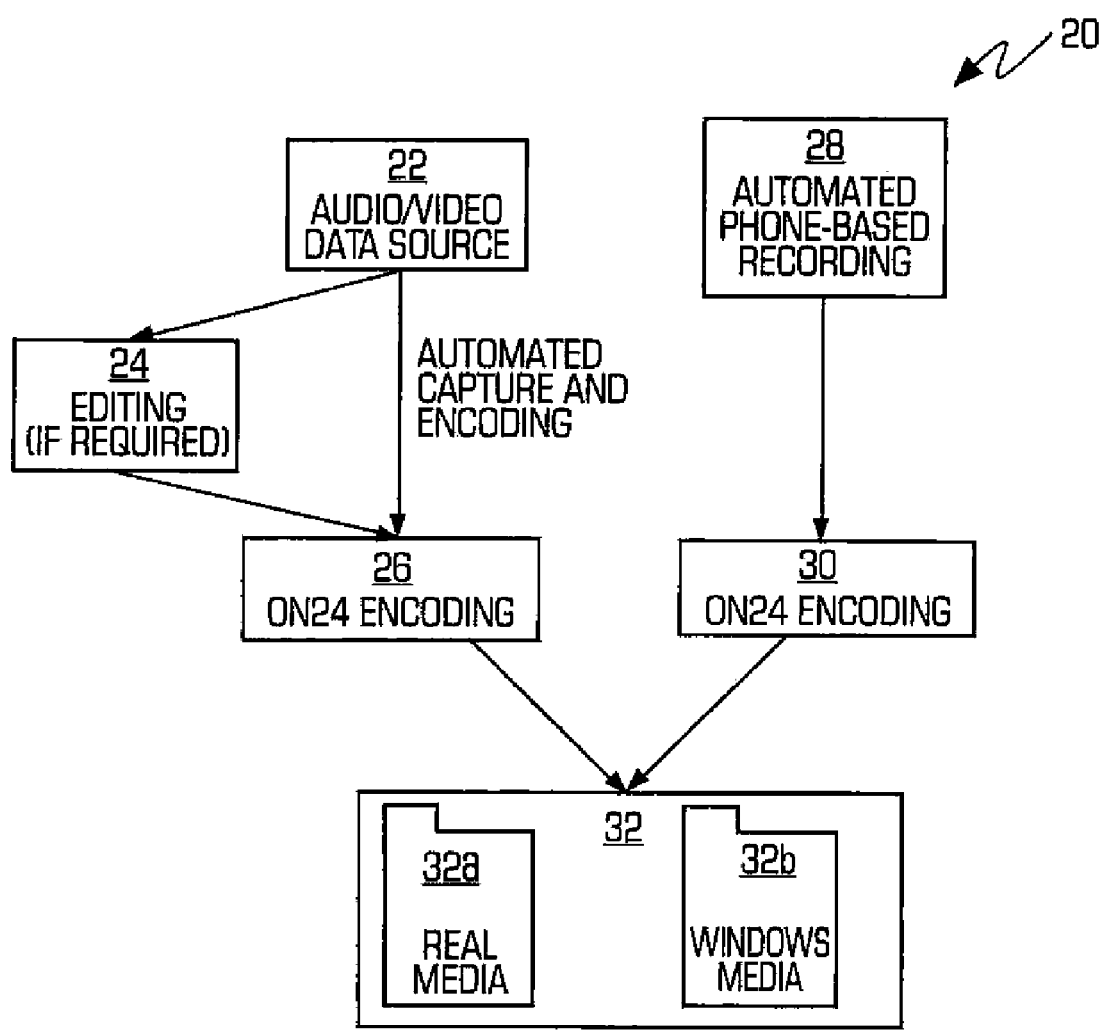
FIG. 1 is a diagram illustrating a method for asset acquisition for an online presentation method.

The invention is particularly applicable to a PowerPoint metadata extraction system and method and it is in this context that the invention will be described. It will be appreciated, however, that the system and method in accordance with the invention has greater utility since the metadata extraction system and method may be used a variety of different files and formats and can extract metadata for the various different file formats. In more detail, the system is described in the context of an online multimedia presentation in which a list of slide titles, from a PowerPoint presentation, that appear as "Agenda", "Transcript", or "Chapter" elements are synchronized with the audio/video as well as graphics and other interactive elements on the screen. However, the invention may be used with other online presentations that can be viewed by an attendee wherein the online presentations may include slides (like Powerpoint graphics), URL's pushed by a Presenter to the Audience member, polls and surveys, comments and questions answered by the Presenter via text or audio/video and/or a view of the shared desktop, or of a particular application on the Presenter's computer.

In the description below, a transcript is a long, textual description of what the presenter is planning to say. A PowerPoint presentation provides a "Notes" area to help a presenter prepare for the presentation. The invention uses the contents of the "notes" field to provide a static, transcript-type text description of the slide being presented. The transcript is not a literal transcription of what the presenter actually said, rather, it is meant to list the gist of the slide, and what the presenter plans to say, or provide as a takeaway with the slide. An agenda is functionality that lists the main topics to be covered during a presentation. The headings for the agenda are extracted from the "Title" field of each slide, creating an automated indexing of the presentation, one per slide. An agenda is typically presented as a panel with several selections. The agenda can also contain a brief description associated with the agenda item, extracted from the "Notes" field for the slide as discussed above for the transcript. A chapter is similar to the agenda in that it provides a mechanism to index the slide deck or the presentation. However, the chapter is typically represented as a "drop-down listbox" and, by default, the chapter may also use the slide "Title" for metadata.

In the online presentation that may use the extracted metadata, an event console is a user interface that is presented to an audience member and contains the online multimedia presentation. In the event console, whenever the Presenter pushes a particular slide to the audience, the transcript, agenda, or chapter displayed on the user interface changes to the newly active slide so that the information is context sensitive. Each of these elements (the transcript, agenda and chapter) can provide the ability for the end-user to use a hyperlink to navigate to a different part of the presentation (a different slide, and in the case of an on-demand streaming audio/video presentation, to the related point in the stream). The hyperlink provides significant interactivity and control to the audience member. If it is not desirable for the purposes of a particular presentation to have each of the individual slides indexed, this system allows for a special "Agenda Slide Deck" to be uploaded. If uploaded, the agenda slide deck becomes the only source of the Transcript, Agenda, and Chapter functionality and any other slides used in the presentation are not used for these interactive features. Now, an on-line presentation system that may use the metadata extraction system will be described.

FIG. 1 is a diagram illustrating a method 20 for asset acquisition for online presentation event system. As shown, an audio/video or audio data source 22 is edited in step 24 if necessary or is automatically captured. In step 26, the data source 22 is encoded. Alternatively, an automated phone-based recording source 28 is encoded in step 30. The encoded data may then be stored in a media database 32, such as in a real media format 32a and/or a windows media format 32b. In this manner, a data source/piece of media is prepared for distribution using an event system, an example of which is shown in FIG. 2.

Figure 2:
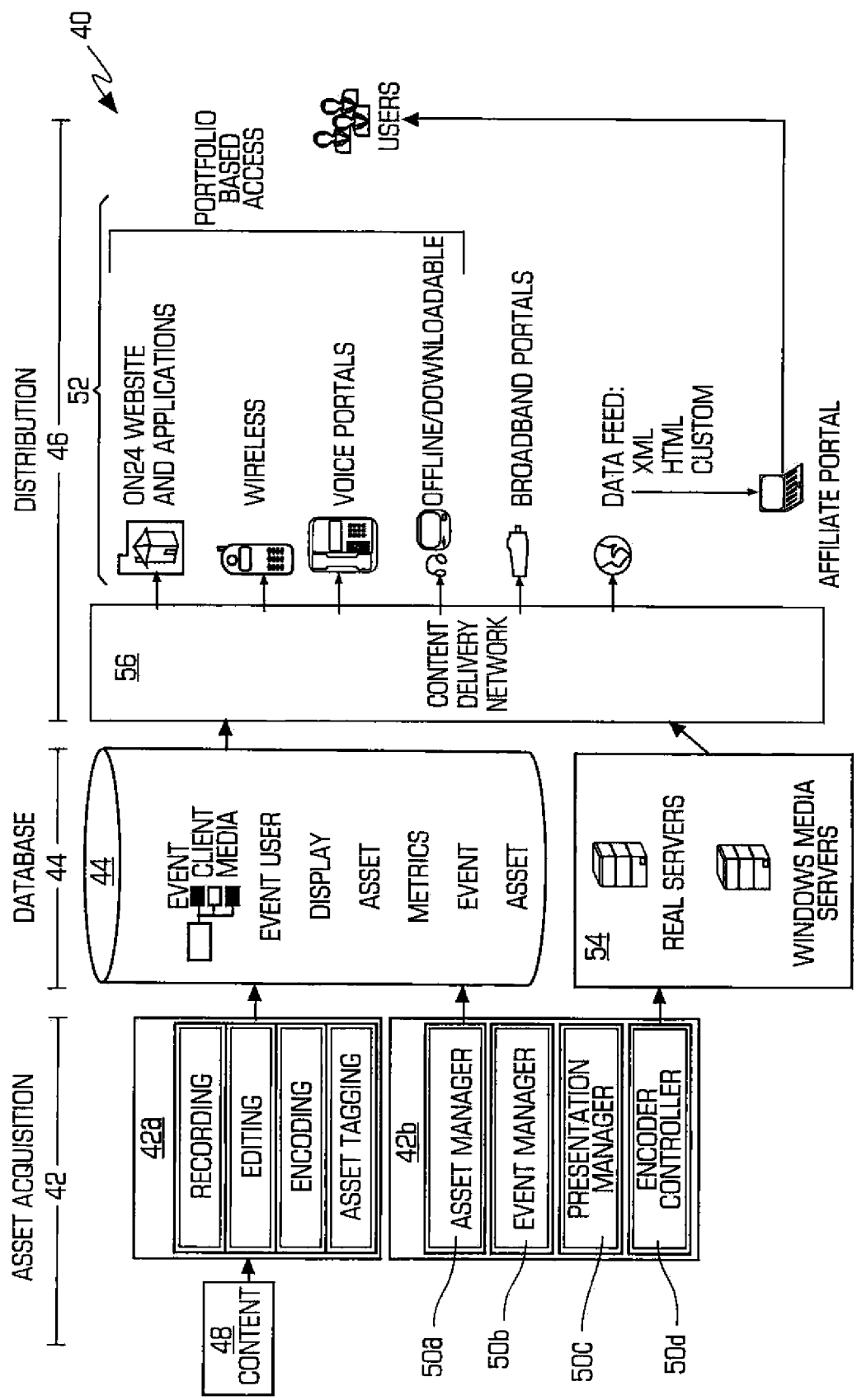
FIG. 2 is a diagram illustrating an example of an online presentation system that may use the metadata extraction system.

FIG. 2 is a diagram illustrating an event system 40 into which the synchronization apparatus may be incorporated. The event system 40 may comprise an asset acquisition and event management portion 42, a database portion 44 and a distribution portion 46 wherein a piece of media/content 48 is input into the event system 40 in order to distribute that content/piece of media during the event. Generally, each element of the event system being described is implemented in software wherein each portion may be one or more software modules and each software modules may be a plurality of computer instructions being executed to perform a particular function/operation of the system. Each element of the system may thus be implemented as one or more computer resources, such as typical personal computers, servers or workstations that have one or more processors, persistent storage devices and memory with sufficient computing power in order to store and execute the software modules that form the frame event system in accordance with the invention. The event system may generate an event that is provided to one or more event clients 52 wherein each client is a computing resource, such as a personal computer, workstation, cellular phone, personal digital assistant, wireless email device, telephone, etc. with sufficient computing power to execute the event client located on the client wherein the client communicates with the event system over a wired or wireless connection.

In more detail, the asset acquisition and event management portion 42 may further comprise an asset acquisition portion 42a and an event management portion 42b wherein the asset acquisition portion performs one or more of the following functions: recording of the piece of media/content, editing of the piece of media/content, encoding of the piece of media/content and asset tagging. The event manager module 42b further comprises an asset manager module 50a, an event manager module 50b, a presentation manager module 50c and an encoder controller 50d. The asset manager module 50a, prior to an event, imports/exports content/pieces of media into/from a library of media as needed and manages the assets for each event presentation. The event manager module 50b may perform actions/function prior to and after an event. Prior to a particular event, the event manager module may reserve the event in the system (both resources and access points), set-up an event console which a user interacts with to manage the event and then send messages to each recipient of the upcoming event with the details of how to access/operate the event. After a particular event, the event manager module 50b may permit a user to import an old event presentation into the system in order to re-use one or more pieces of the old event presentation. The presentation manager module 50c, during a particular event presentation, generates an event file with the slides of the event presentation, URLs and polls to an encoder controller to distribute the particular event presentation to the users. The encoder controller 50d encodes the event presentation stream to one or more distribution server 54 that distributes the event presentation to the users.

As shown in FIG. 2, the database 44 may include data about each event, including the clients to which the event is being provided and the media associated with the event, one or more event users, the display of the particular event, the assets associated with the event, the metrics for the event and other event data. In combination with this data in the database for a particular event, operations and commands from the event manager module 42b are downloaded to the distribution servers 54 that distribute each event to each client 52 for the particular event over a distribution network 56. As shown, the event/presentation may be distributed to one or more different clients 52 that use one or more different methods to access the event. The clients 52 may include a client that downloads the presentation and then views the presentation offline.

Figure 3:
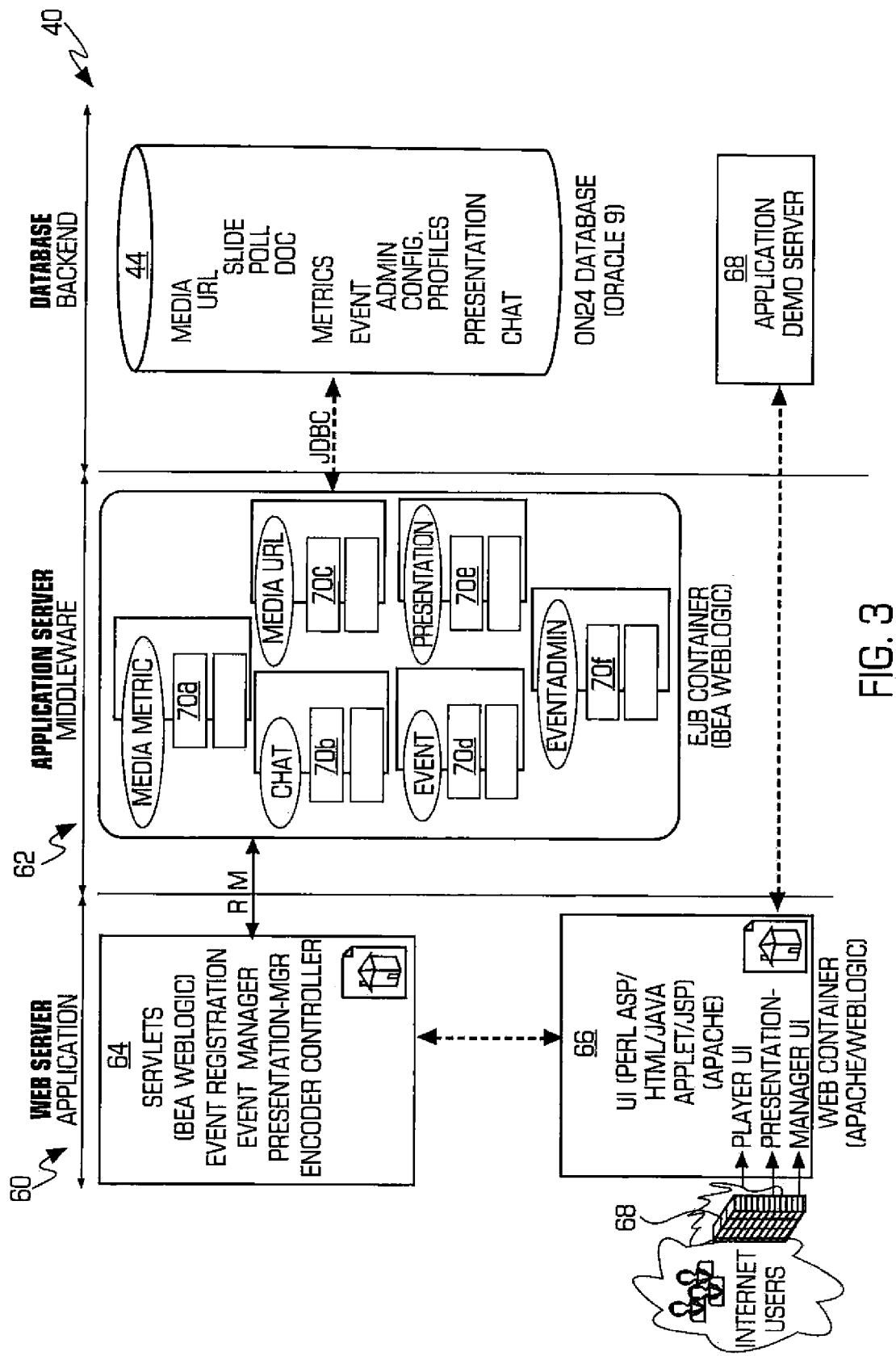
FIG. 3 illustrates a system architecture of the online presentation system shown in FIG. 2.

FIG. 3 illustrates more details of the event system shown in FIG. 2. The event system may include a web server portion 60, an application server portion 62 and the database portion 40 (with the database 44) shown in FIG. 2. Each of these portions may be implemented as one or more computer resources with sufficient computing resources to implement the functions described below. In a preferred embodiment, each portion may be implemented as one or more well-known server computers. The web server portion 60 may further comprise one or more servlets 64 and a web container portion 66 which are both behind a typical firewall 68. In a preferred embodiment of the invention, the servlets reside on a BEA Weblogic system which is commercially available and may include an event registration servlet, an event manager module servlet, a presentation manager module servlet and an encoder controller servlet that correspond to the event manager module 50b, presentation manager module 50c and encoder controller 50c shown in FIG. 2. Each of these servlets implement the functions and operations described above for the respective portions of the system wherein each servlet is a plurality of lines of computer code executed on a computing resource with sufficient computing power and memory to execute the operations. The servlets may communicate with the application server portion 62 using well-known protocols such as, in a preferred embodiment, the well-known remote method invocation (RMI) protocol. The servlets may also communicate with the web container portion 66 which is preferable implemented using an well-known Apache/Weblogic system. The web container portion 66 generates a user interface, preferably using Perl Active Server Page (ASP), HTML, XML/XSL, Java Applet, Javascript and Java Server Pages (JSPs.) The web container portion 66 may thus generate a user interface for each client and the presentation manager module user interface. The user interface generated by the web container portion 66 may be output to the clients of the system through the firewall as well as to an application demo server 68 that permits a demo of any presentation to be provided.

The application server portion 62 may preferably be implemented using an Enterprise JavaBeans (EJBs) container implemented using a BEA Weblogic product that is commercially sold. The application server management portion 62 may be known as middleware and may include a media metric manager 70a, a chat manager 70b, a media URL manager 70c, an event manager 70d, a presentation manager 70e and an event administration manager 70f which may each be software applications performed the specified management operations. The application server portion 62 communicates with the database 44 using a protocol, such as the well-known Java Database Connectivity (JDBC) protocol in a preferred embodiment of the invention. The database 44 may preferably be implemented using an Oracle 8/9 database product that is commercially available. As shown, the database 44 may include media data including URL data, slide data, poll data and document data. The database 44 may further include metric data, event data and chat data wherein the event data may further preferably include administration data, configuration data and profile data.

Figure 4:
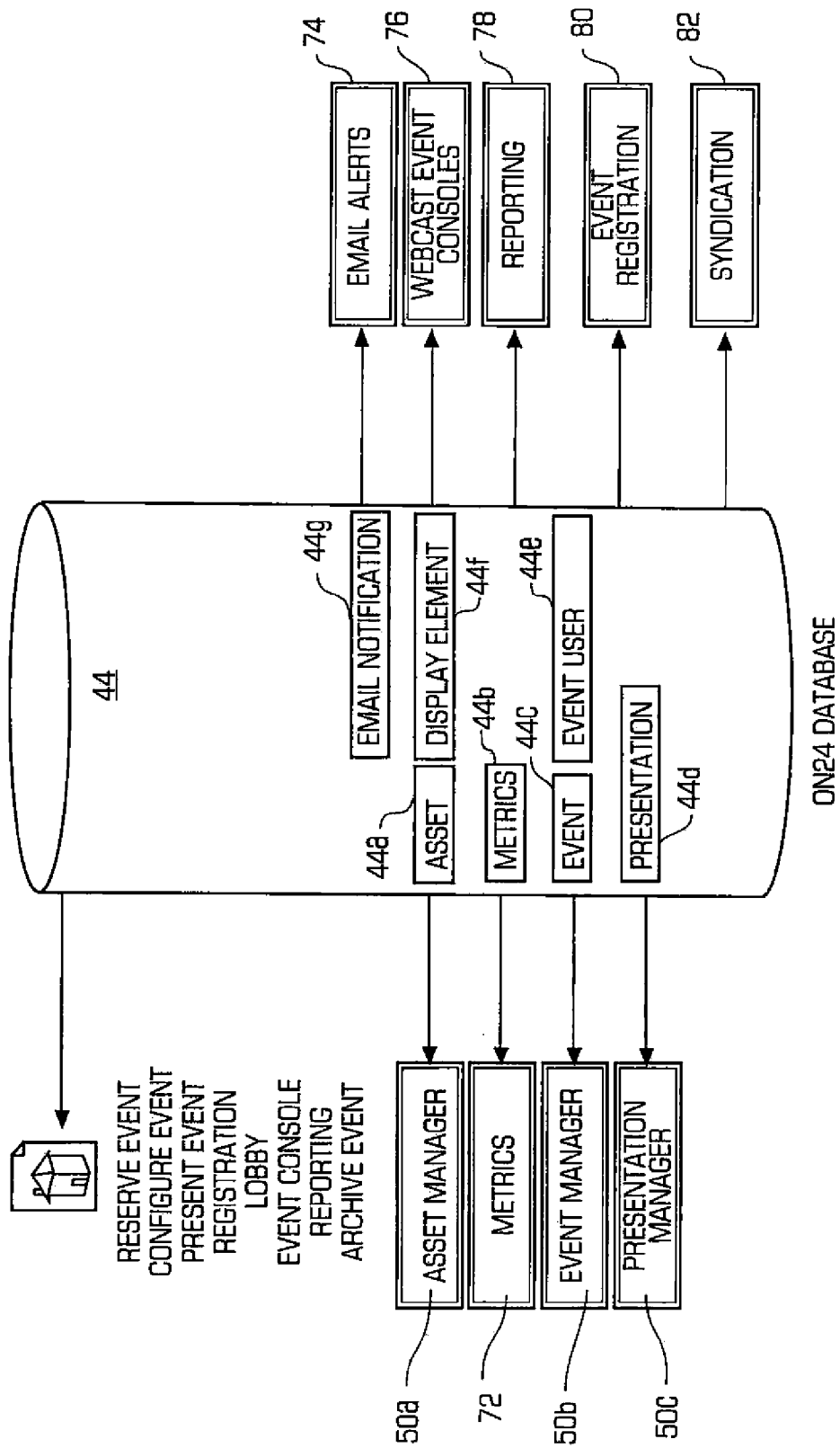
FIG. 4 is a functional diagram of the interacting components of the online presentation system in FIG. 3.

FIG. 4 is a diagram illustrating more details of the event database 44 in FIG. 3. As shown in FIG. 4, the database may generate data that is used to implement a function to reserve an event, to configure an event, a present an event, for registration, for the lobby, for the event console, for reporting and for archiving an event. The database may include asset data 44a that may be provided to the asset manager module 50a, metrics data 44b that is provided to a metric module 72, event data 44c that is provided to the event manager module 50b, presentation data 44d that is provided to the presentation manager module 50c, event user data 44e that is provided to an event registration module 80, display element data 44f that is provided to an event consoles module 76 and email notification data 44g that is provided to an email alerts module 74. The database may also store data that is used by a reporting module 78 to generate reports about the events and presentations provided by the system. The database may also store data that is used by a syndication module 82 to syndicate and replicate existing presentations.

Figure 5:
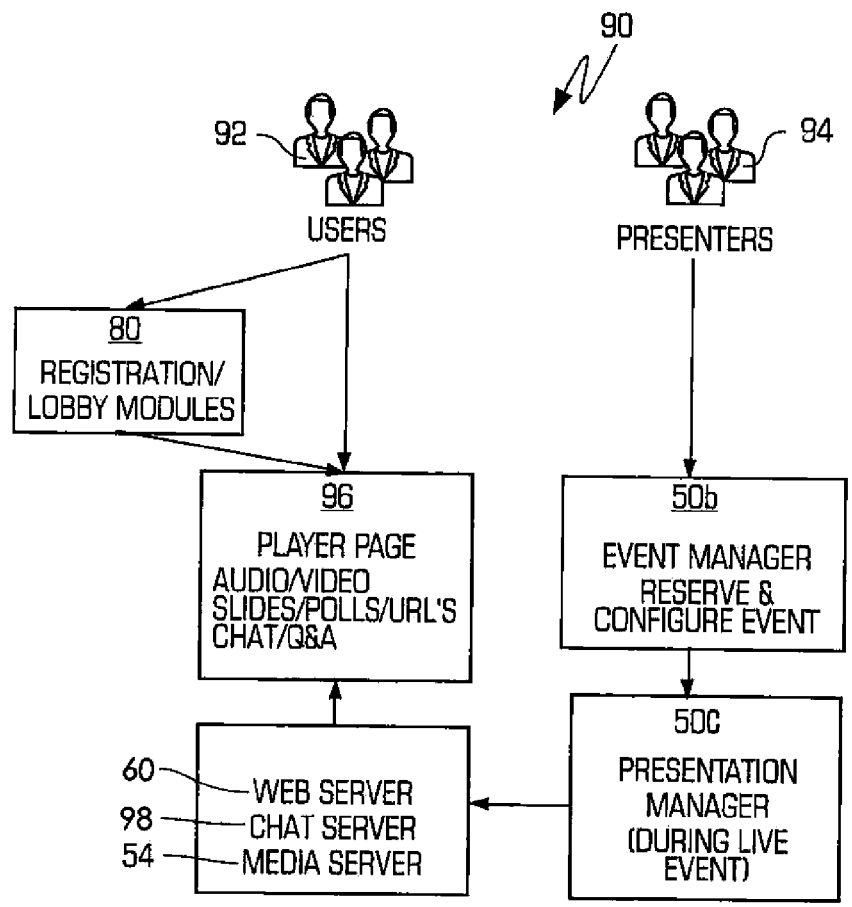
FIG. 5 is a diagram illustrating a presentation workflow.

FIG. 5 is a diagram illustrating an event center 90 that may be utilized by one or more users 92 that are presented with a presentation by the system and one or more presenters 94 who utilize the system to present presentations to the users 92. The users 92 may interact with a registration and lobby modules 80 that permit the users to register with the system and schedule a presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the media server 54 and a chat server 98 that provides the chat functionality for a presentation. The presentation data for a live event presentation is provided to the servers 54, 60 and 98 by the presentation manager module 50c. The presenters 94 may utilize the event manager module 50b to reserve an event and/or configure an event. Once the event is reserve and configured, the presentation data is forwarded to the presentation manager module 50c.

Figure 6:
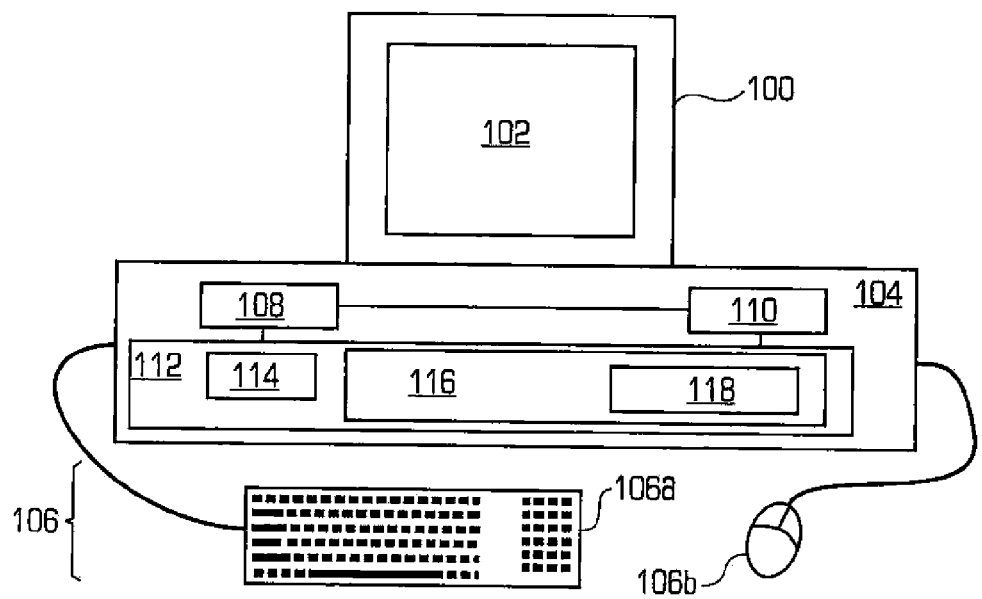
FIG. 6 is a diagram illustrating an example of a online presentation client that may incorporate the metadata extraction system.

FIG. 6 is a diagram illustrating an example of a online presentation client 100 that may incorporate the metadata extraction apparatus. The event client 100 may be implemented as a personal computer, workstation, PDA, cellular phone and the like with sufficient computing power to implement the functions of the client as described below. In the example shown in FIG. 6, the event client may be a typical personal computer that may further comprise a display unit 102, such as a CRT or liquid crystal display or the like, a chassis 104 and one or more input/output devices 106 that permit a user to interact with the client 100, such as, for example, a keyboard 106a and a mouse 106b. The chassis 104 may further include one or more processors 108, a persistent storage device 110, such as a hard disk drive, optical disk drive, tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor(s) 108. The memory may further include an operating system 114, such as Windows, and a typical browser application 116, such as Microsoft Internet Explorer, Mozilla Firefox or Netscape Navigator and an event console module 118 (including a slide, polls, survey, URL, Q&A) that operates within the browser application. The client side of the system/apparatus is implemented as HTML and Javascript code that is downloaded/streamed to the client 100 during/prior to each presentation so that the synchronization of the assets does not require separate client software downloaded to the client. Now, the metadata extraction system will be described in more detail.

Figure 9:
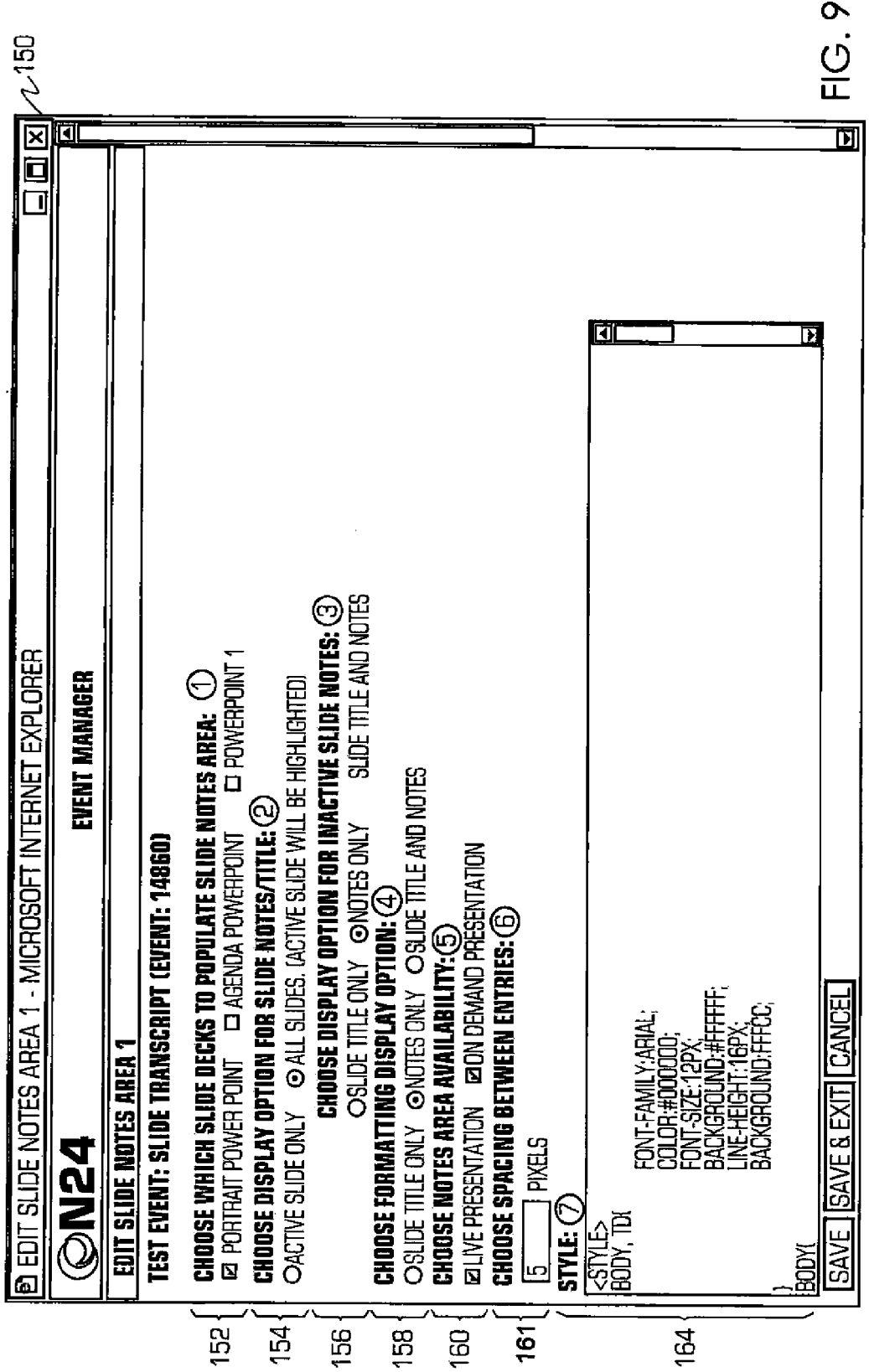
FIG. 9 illustrates a user interface for configuring the information in a PowerPoint presentation.

FIG. 7 illustrates a metadata extraction method 120. The described metadata extraction method preferably is implemented on a combination of the client shown in FIG. 6 and the server 40 shown in FIG. 1. On each of the client and the server, the method is preferably implemented as a plurality of computer instructions (as a piece of software or a module) that are executed by the processor(s) on each of the client and server computers. In step 122, the presenter (the individual that is going to present the online presentation to one or more audience members) may generate a PowerPoint presentation on the client 100 in FIG. 6. The PowerPoint presentation may include one or more slides of the presentation as well as title data in a title field and notes data in a notes field. In step 124, the presenter may upload the PowerPoint slide deck to the online presentation system (using the browser application) wherein the PowerPoint presentation is stored in the database 44. To implement the metadata extraction method, the server may include a metadata extraction software module (that is part of the event manager module 50b) so that, in step 126, the server (by executing the computer instructions of the metadata extraction software module) extracts the notes and title data from the PowerPoint presentation as well as the slide image data for each slide of the PowerPoint presentation which are all stored in the database. To extract the metadata from the PowerPoint presentation (or other file), each slide of the file is accessed using an interface, such as the Microsoft PowerPoint COM interface for a PowerPoint presentation, and the relevant data is accessed using the API. In accordance with the invention, the relationship between these data elements are maintained so that the appropriate title and notes data is associated with the appropriate slide. In step 128, using a configuring tool on the server (an example of the user interface for the configuring is shown in FIG. 9), the presenter can configure the event console, such as selecting whether the agenda, notes or chapter styles will be used for the online presentation. More details of the configuration of the online presentation based on the extracted metadata will be described below using FIG. 9. Once the event console has been configured to use the extracted metadata, the online presentation using the extracted metadata is ready to be used by the presenter.

FIG. 8 illustrates an online presentation method 130 using the extracted metadata. In step 132, during the online presentation, a slide is to be displayed to the audience members. In step 134, the server determines, for each slide of the presentation, if the area being displayed in the event console includes the agenda, chapter and/or notes data. In step 136, if the area to be displayed does not include the agenda, chapter or notes data, the online presentation system displays the standard event console that does not include agendas, notes or slide interactivity. In step 138, if the area to be displayed includes the agenda, chapter or notes data, the system retrieves the extracted notes and title data (from the database) for each slide deck selected to display notes. Several examples of the event console that displays the extracted metadata are shown in FIGS. 10-16. Now, the user interface for configuring the event console for the extracted metadata is described.

FIG. 9 illustrates a user interface 150 for configuring the metadata displayed during a PowerPoint presentation. The user interface illustrates an example of how a presenter can configure the metadata information from a PowerPoint Presentation and display the metadata in the event console wherein each number in the screenshot represents a setup option. A first setup option user interface portion 152 allows a presenter to include any combinations of PowerPoint Presentation decks in event console. In the example shown in FIG. 9, three different slide decks to populate the slide notes area are shown although the invention is not limited to a particular number of slide decks from which the notes area may be generated. A second setup option user interface portion 154 allows the presenter to choose the display option for the slide notes and/or titles and how many entries can appear in the area reserved for transcripts in the event console. When "Active slide only" is selected, information related to the slide which the presenter is currently talking about is displayed to the audience members. If the "All slides" option is selected, all the information for all selected slide get displayed and the active slide will be highlighted.

A third setup option user interface portion 156 is relevant to the "All slides" option only. This option lets the presenter determine what the audience members see in the event console for inactive slides. The option permits the presenter to select "Slide Title Only" that displays only the title of the slide, "Notes Only" that displays only the associated notes to the slides, and "Slide Title and Notes" that displays the slide title as well as notes. A fourth setup option user interface portion 158 permits the presenter to configure what information end-users see for the active slides which can include "Slide Title Only", "Notes Only" and "Slide Title and Notes" which are the same options described above. A fifth setup option user interface portion 160 allows the presenter to select when they want to display the Notes information in an event console where the presenter can select from a Live Presentation, an Ondemand Presentation or both.

A sixth setup option user interface portion 161 allows the presenter to configure the vertical spacing between adjacent entries of the slide information. A seventh setup option user interface portion 164 allows the presenter to control the display (style) of the actual information displayed in Event Console. One or more known cascading style sheets (CSS) can be used to control the fonts, sizes and lot of other display aspects. Now, a number of examples of the event console that incorporates the extracted metadata in accordance with the invention is described.

Figure 10:
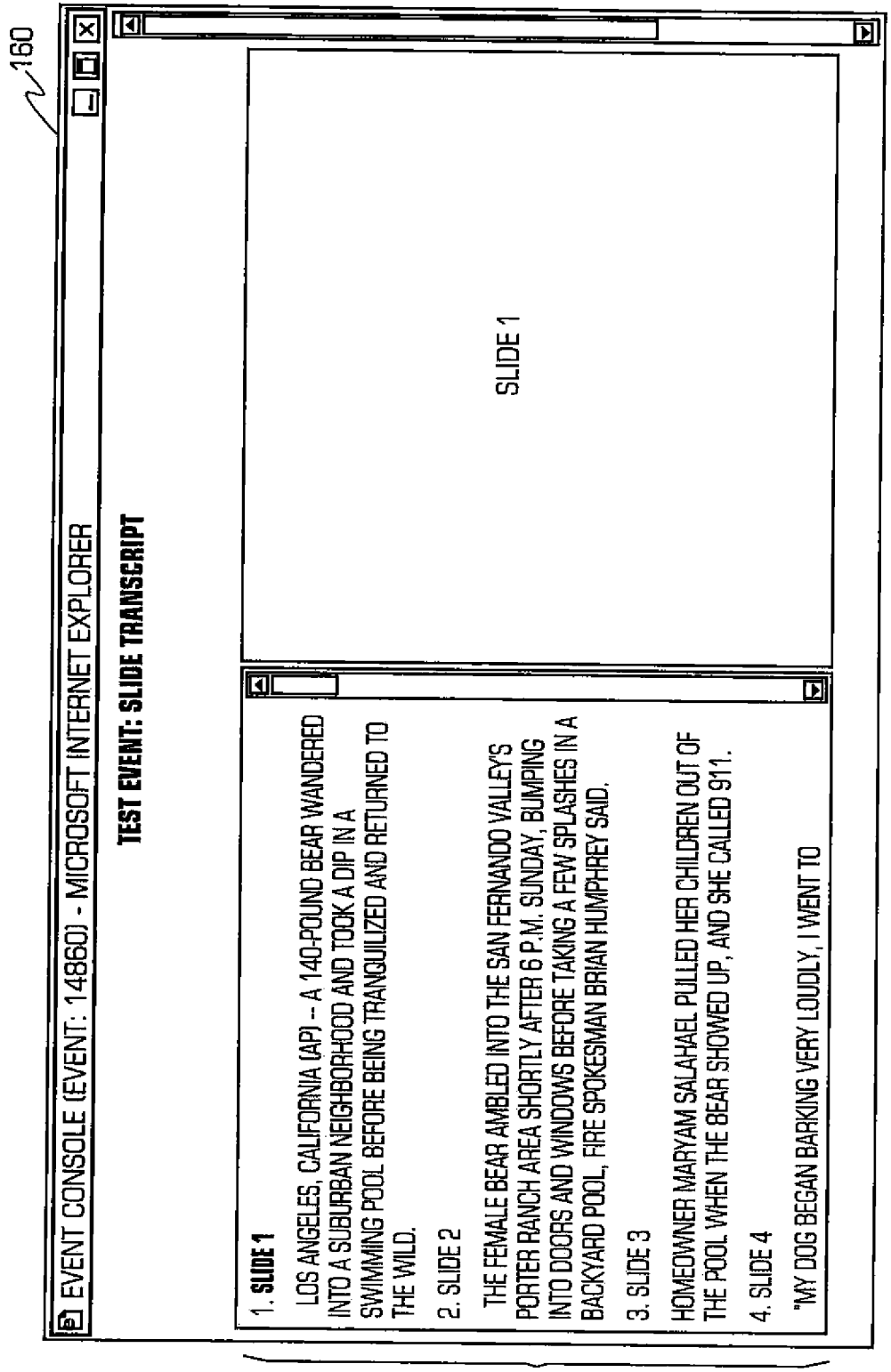
FIG. 10 illustrates an example of the user interface using a first configuration of the metadata.

In the examples of the event console set forth below, a very simple event console with different kinds of configurations possible for above-mentioned functionality are shown. In accordance with the invention, the invention can be used with any event console and is not limited to the simple event consoles shown in FIGS. 10-16. In these examples, the selected values for the selected slide deck (option #1), the Live or OnDemand availability option (option #5), the vertical spacing option (option #6) and the CSS option (option #7) are unchanged. FIG. 10 illustrates an example of an event console user interface 160 using a first configuration of the metadata in accordance with the invention. In these examples of the event console, the event console has a display element portion (that in these examples displays each slide) and a metadata display portion that displays the extracted metadata associated with the particular display element. In this example, the event console displays all slides, slide title and notes for inactive slides and slide title and notes for the active slides. Thus, as shown in a slide transcript portion 162 of the user interface, a title for each slide as well as the notes for each slide is displayed. In addition, the active slide (Slide #1 in this example) is highlighted.

Figure 11:
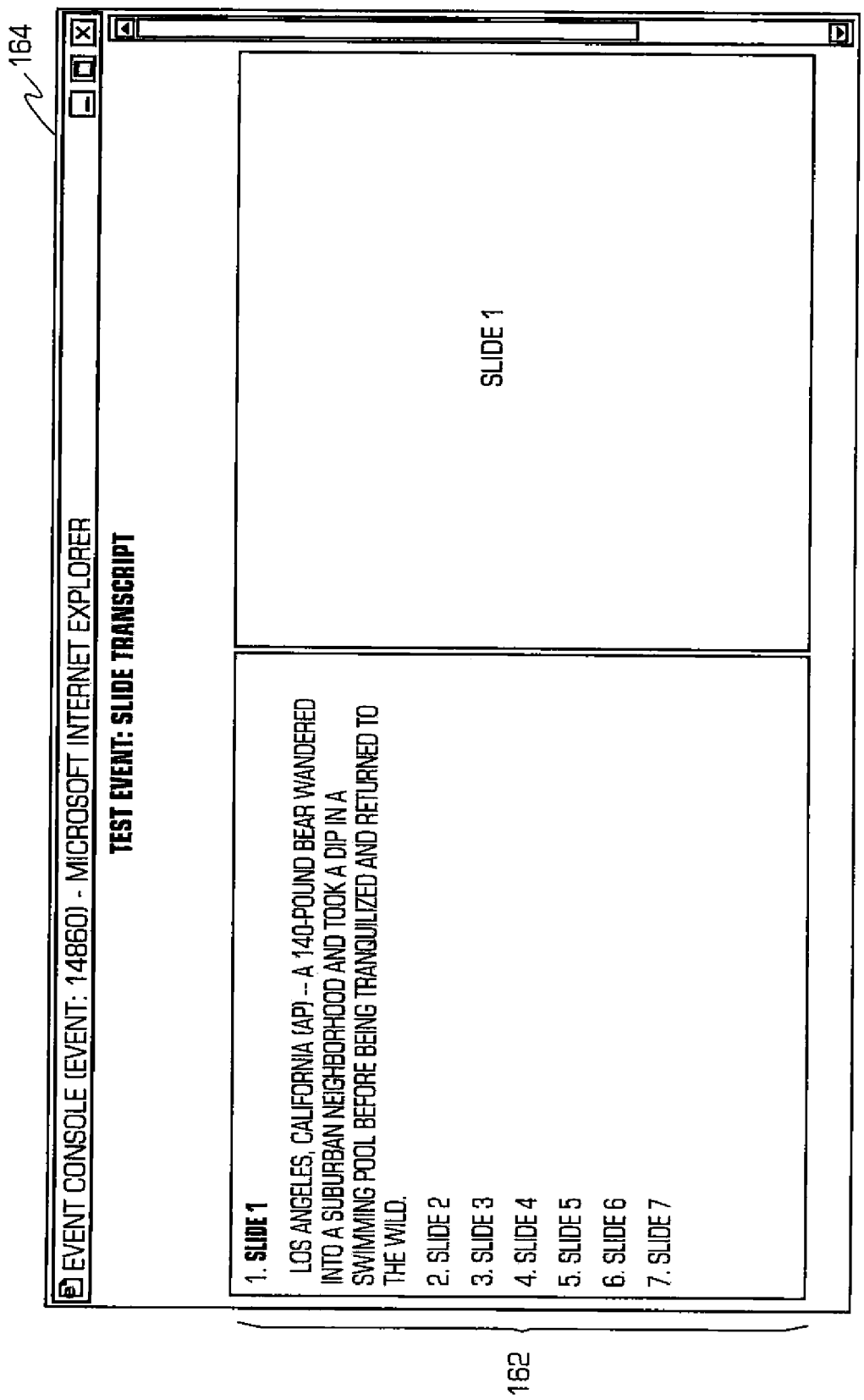
FIG. 11 illustrates an example of the user interface using a second configuration of the metadata.
Figure 12:
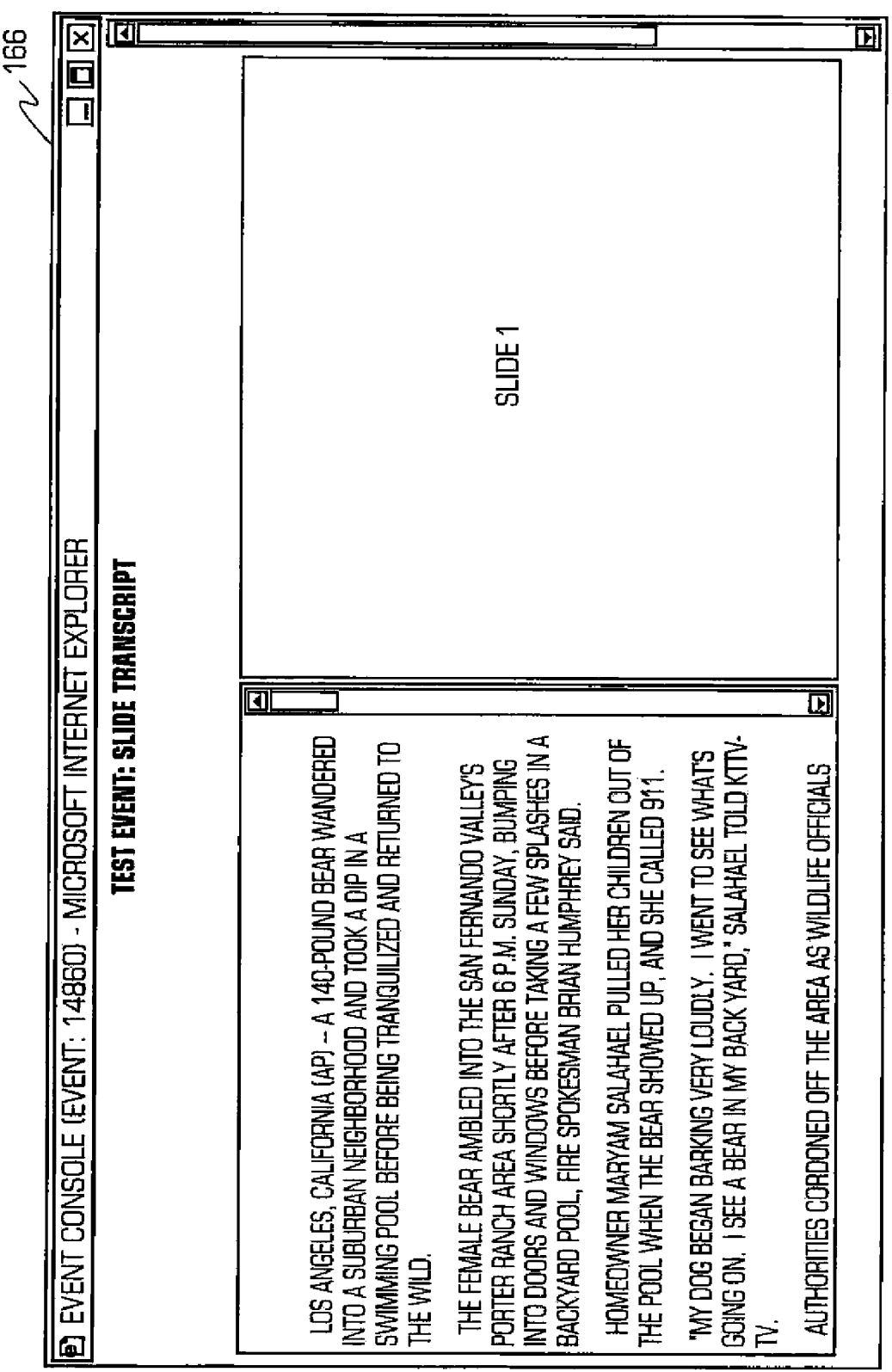
FIG. 12 illustrates an example of the user interface using a third configuration of the metadata.

FIG. 11 illustrates an example of a user interface 164 using a second configuration of the metadata in accordance with the invention. In this example, the event console displays all slides, displays only the title of the inactive slides and the slide title and notes of the active slide. Thus, in the portion 162, the title and notes of the active slide (slide #1 in this example) are displayed while the titles of the inactive slides are shown. Thus, by configuring the event console to use the extracted metadata, the presenter is able to control the display of the extracted metadata information. FIG. 12 illustrates an example of a user interface 166 using a third configuration of the metadata in accordance with the invention. In this example, the event console displays all slides, displays slide notes only for active and inactive slides. In FIG. 12, the notes for the active slide only is shown.

Figure 13:
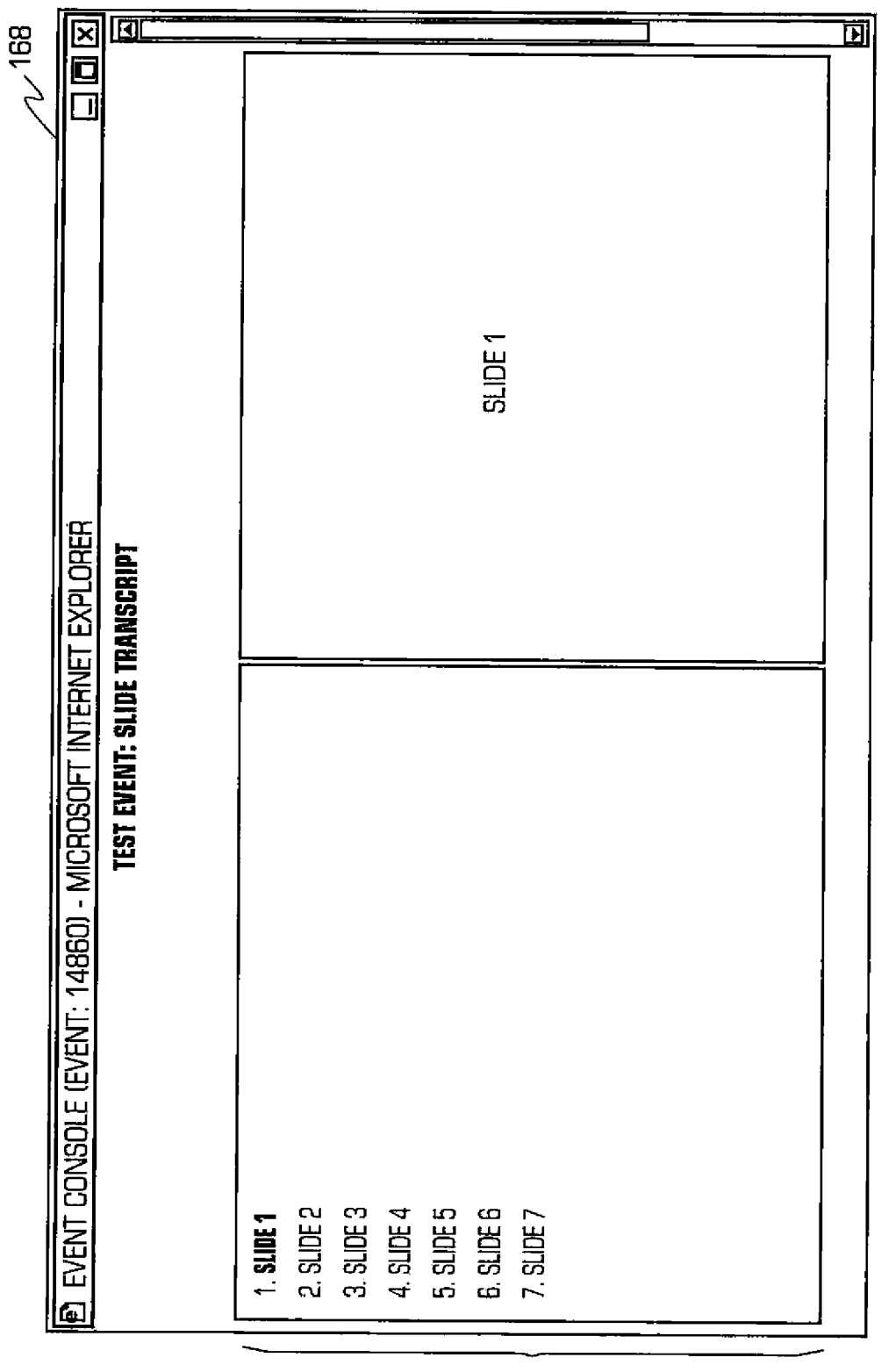
FIG. 13 illustrates an example of the user interface using a fourth configuration of the metadata.
Figure 14:
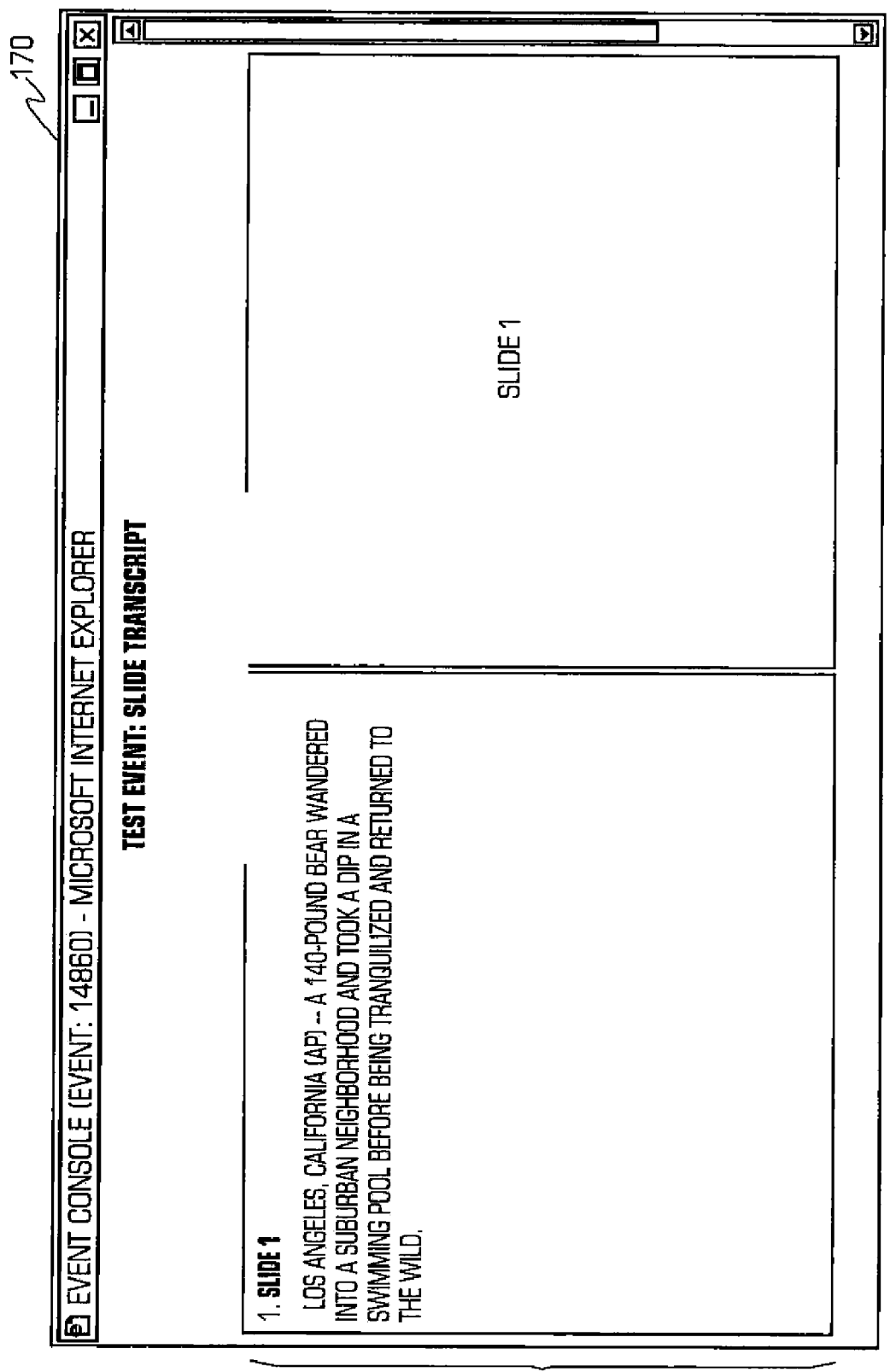
FIG. 14 illustrates an example of the user interface using a fifth configuration of the metadata.
Figure 15:
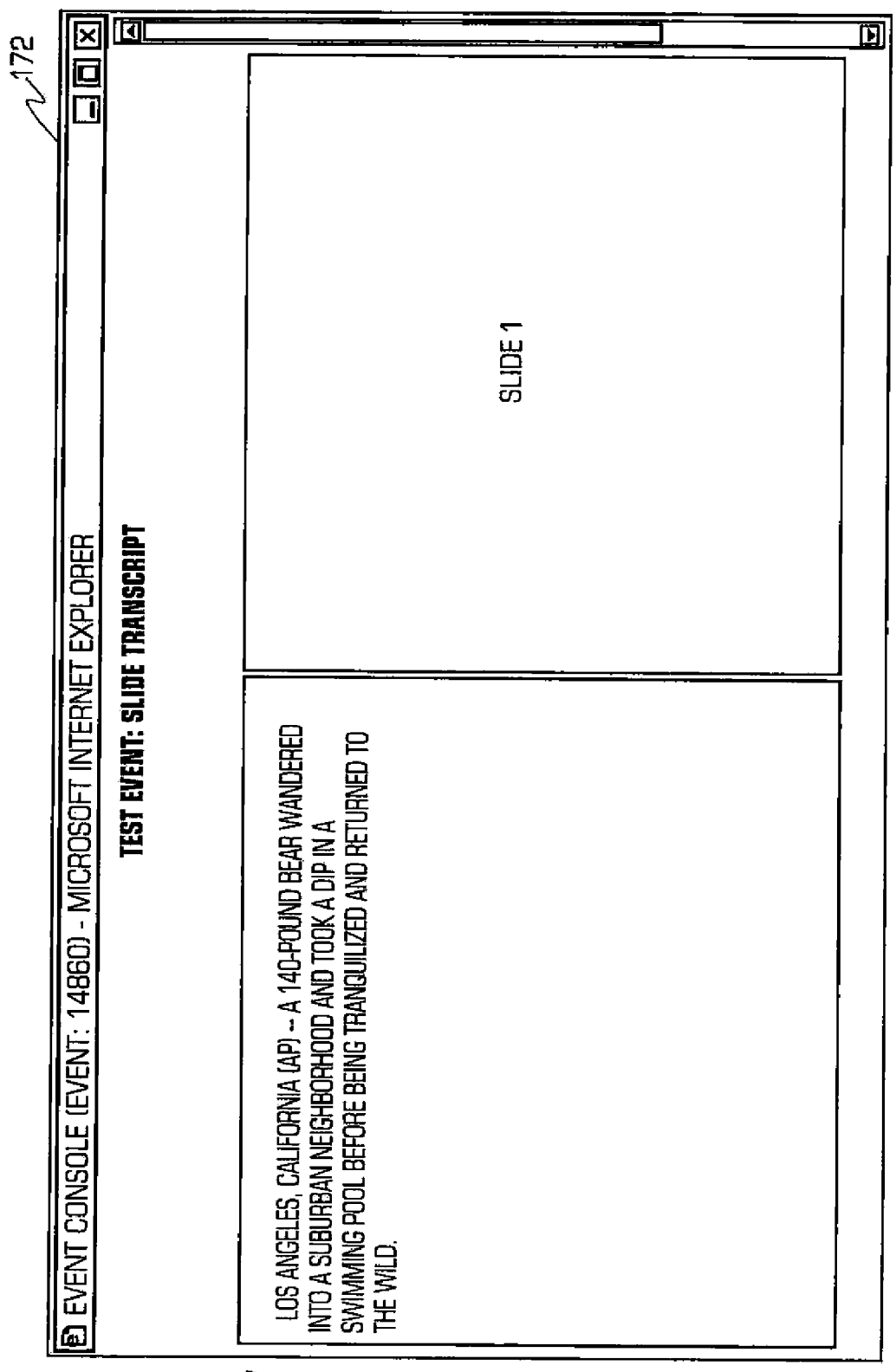
FIG. 15 illustrates an example of the user interface using a sixth configuration of the metadata.
Figure 16:
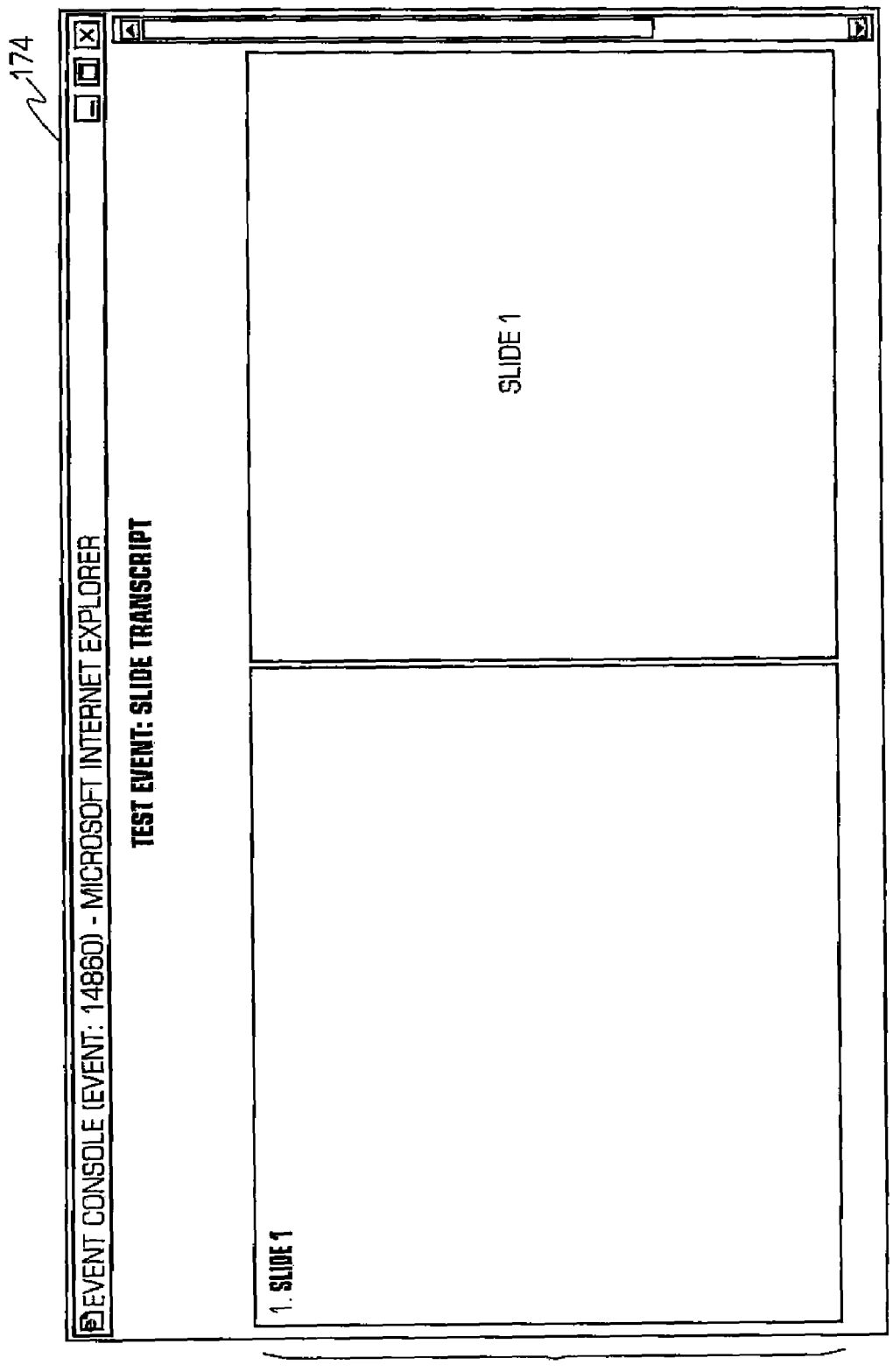
FIG. 16 illustrates an example of the user interface using a seventh configuration of the metadata.

FIG. 13 illustrates an example of a user interface 168 using a fourth configuration of the metadata in accordance with the invention. In this example, the event console displays all slides, but displays slide titles only for both the inactive and active slides. FIG. 14 illustrates an example of a user interface 170 using a fifth configuration of the metadata in accordance with the invention wherein only active slides are displayed in the event console and the slide title and notes of the active slide are displayed as shown in FIG. 14. FIG. 15 illustrates an example of a user interface 172 using a sixth configuration of the metadata in accordance with the invention. In this example, extracted metadata for only active slides are displayed in the event console and only slide notes of the active slides are displayed. FIG. 16 illustrates an example of a user interface 174 using a seventh configuration of the metadata in accordance with the invention. In this example, extracted metadata for only active slides are displayed in the event console and the slide titles are displayed for the active slides.

The metadata extraction system is self-contained and does not require the download of any proprietary software to generate the metadata other than the program already being used by the presenter (PowerPoint in the example described) to generate the presentation. The system also does not require data entry in an external software system or database to store meta-data associated with a presentation. The system can be used with live or on-demand versions of the presentations. Advantageously, since the end-user does not have to master a new application to enter the metadata into the application, the chances of user error are reduced, the amount of time required for training the user is minimal, and the security concerns associated with using yet another application are also reduced. Furthermore, as information in the PowerPoint slide changes, it is easy for the creator of the PowerPoint file to add in the metadata into the slide deck, leading to better maintainability of the presentation. As a result, there is a consistent and higher quality user experience for all viewers, and a more streamlined setup process.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A metadata extraction and presentation system for an online presentation, comprising:
 a first computer comprising a metadata extraction tool and a database containing a presentation file, the presentation file having one or more pieces of metadata, the metadata extraction tool is coupled to the database and automatically performs an extraction process on the one or more pieces of metadata from the presentation file contained in the database, the one or more pieces of metadata being associated with the presentation file, the extraction process comprising saving the one or more pieces of metadata from the presentation file to a metadata file in the database separate from the presentation file and maintaining an association between the metadata file and the presentation file; and
 a second computer communicatively coupled to the first computer to receive the presentation file and the metadata file, the second computer comprising an event console having a display element portion and a metadata display portion wherein the display element portion displays a particular display element generated from the presentation file and the metadata display portion displays a configurable portion of the extracted metadata associated with the particular display element.

2. The system of claim 1, wherein the one or more display elements further comprise one or more slides, and the extracted metadata further comprising title data and notes data.

3. The system of claim 2, wherein the presentation further comprises a PowerPoint presentation.

4. The system of claim 3, wherein the metadata extraction tool extracts the metadata using an application programming interface.

5. The system of claim 4, wherein the application programming interface further comprises a PowerPoint COM interface.

6. The system of claim 2, wherein the configurable portion of the extracted metadata further comprises one of title and note data for the particular display element, note data for the particular display element and title data for the particular display element.

7. The system of claim 2, wherein the presentation further comprises a plurality of display elements, and wherein the configurable portion of the extracted metadata further comprises one of title data for the plurality of display elements and the title and note data for the particular display element, title data for the plurality of display elements including the particular display element, title and note data for the plurality of display elements and note data for the plurality of display elements.

8. The system of claim 1 wherein the extraction process is performed when the presentation file is added to the database.

9. A metadata extraction and presentation system of claim 1, wherein the metadata extraction tool further saves the one or more display elements as an image file and maintains an association between the metadata file and the image file; and wherein the particular display element is the image file.

10. A computer readable medium containing computer readable instructions that, when executed, perform a method for metadata extraction and presentation for an online presentation, the method comprising:
 receiving, from a database, a presentation file at a first computer, the presentation file having one or more display elements and one or more pieces of metadata;
 automatically extracting, at the first computer, the one or more pieces of metadata from the presentation file, the one or more pieces of metadata being associated with the one or more display elements of the presentation file, saving the one or more pieces of metadata from the presentation file to a metadata file separate from the presentation file, maintaining an association between the presentation file and the metadata file;
 transmitting the metadata file and the presentation file from the first computer to a second computer; and
 displaying a presentation at the second computer to a user using an event console having a display element portion and a metadata display portion, wherein the display element portion displays a particular display element generated from the presentation file and the metadata display portion displays a configurable portion of the extracted metadata associated with the particular display element.

11. The method of claim 10, wherein the one or more display elements further comprise one or more slides, and the extracted metadata further comprising title data and notes data.

12. The method of claim 11, wherein the presentation further comprises a PowerPoint presentation.

13. The method of claim 12, wherein extracting the metadata further comprises extracting the one or more pieces of metadata further comprises extracting the one or more pieces of metadata using an application programming interface.

14. The method of claim 13, wherein the application programming interface further comprises a PowerPoint COM interface.

15. The method of claim 11, wherein selecting the configurable portion of the extracted metadata further comprises selecting one of title and note data for the particular display element, note data for the particular display element and title data for the particular display element.

16. The method of claim 11, wherein the presentation further comprises a plurality of display elements, and wherein selecting the configurable portion of the extracted metadata further comprises selecting one of title data for the plurality of display elements and the title and note data for the particular display element, title data for the plurality of display elements including the particular display element, title and note data for the plurality of display elements and note data for the plurality of display elements.

17. The method of claim 10, wherein the displaying the presentation further comprises selecting the configurable portion of the extracted metadata.

18. The method of claim 10 wherein the extracting of one or more pieces of metadata from the presentation file occurs immediately upon the receiving of the presentation file, and the displaying of the presentation occurs in response to a selection, where the selection occurs after the extracting of the one or more pieces of metadata from the presentation file.

19. The method of claim 10 wherein the particular display element of the presentation is an image data file extracted from the presentation file by the first computer.

* * * * *